(12) United States Patent
Rozman et al.

(10) Patent No.: US 9,941,827 B2
(45) Date of Patent: Apr. 10, 2018

(54) HIGH VOLTAGE DC POWER GENERATING SYSTEM INCLUDING SELECTIVELY REMOVABLE NEUTRAL NODE

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 49 days.

(21) Appl. No.: 15/176,225

(22) Filed: Jun. 8, 2016

(65) Prior Publication Data

US 2017/0359009 A1  Dec. 14, 2017

(51) Int. Cl.
| | | |
|---|---|---|
| *H02P 9/10* | (2006.01) | |
| *H02P 9/14* | (2006.01) | |
| *H02P 9/00* | (2006.01) | |
| *H02K 11/049* | (2016.01) | |
| *H02K 11/27* | (2016.01) | |
| *H02K 11/30* | (2016.01) | |
| *H02K 1/27* | (2006.01) | |
| *H02K 3/28* | (2006.01) | |
| *H02P 29/024* | (2016.01) | |
| *H02P 9/48* | (2006.01) | |
| *H02H 7/06* | (2006.01) | |
| *F03D 9/00* | (2016.01) | |

(52) U.S. Cl.
CPC ............. *H02P 9/006* (2013.01); *H02K 1/27* (2013.01); *H02K 3/28* (2013.01); *H02K 11/049* (2016.01); *H02K 11/27* (2016.01); *H02K 11/30* (2016.01); *H02P 9/14* (2013.01); *H02P 9/48* (2013.01); *H02P 29/024* (2013.01)

(58) Field of Classification Search
USPC ........................................ 322/27, 63; 290/44
See application file for complete search history.

(56) References Cited

U.S. PATENT DOCUMENTS 7,420,288 B2* 9/2008 Calley .................. F03D 7/0256
290/43
7,521,906 B2* 4/2009 Rozman .................... H02P 9/10
322/24

(Continued)

FOREIGN PATENT DOCUMENTS

EP  2075899  7/2009

OTHER PUBLICATIONS

European Search Report for Application No. 17173698.6 dated Feb. 15, 2018.

*Primary Examiner* — Pedro J Cuevas
(74) *Attorney, Agent, or Firm* — Carlson, Gaskey & Olds, P.C.

(57) ABSTRACT

A high voltage DC electric power generating system includes a poly-phase permanent magnet generator having at least one control winding and a plurality of power windings. Each of the power windings is a phase of the poly-phase permanent magnet generator. A passive rectifier connects a switch to an input of each of the power windings such that the switch is a neutral node in a closed state and a disconnect in an open state.

21 Claims, 4 Drawing Sheets

(56) References Cited

U.S. PATENT DOCUMENTS

| | | | | |
|---|---|---|---|---|
| 7,573,144 B1* | 8/2009 | Saban | | H02J 3/30 |
| | | | | 290/4 R |
| 7,573,146 B2* | 8/2009 | Calley | | F03D 7/0256 |
| | | | | 290/44 |
| 7,710,081 B2* | 5/2010 | Saban | | H02K 3/28 |
| | | | | 290/4 R |
| 7,859,230 B2 | 12/2010 | Rozman et al. | | |
| 7,960,948 B2* | 6/2011 | Saban | | H02K 3/28 |
| | | | | 310/162 |
| 8,247,914 B2* | 8/2012 | Calley | | F03D 7/0256 |
| | | | | 290/44 |
| 8,922,153 B2 | 12/2014 | Nashiki et al. | | |
| 8,975,876 B2* | 3/2015 | Rozman | | H02P 9/305 |
| | | | | 322/28 |
| 9,054,610 B2* | 6/2015 | Rozman | | H02P 9/02 |
| 9,059,647 B2 | 6/2015 | Rozman et al. | | |
| 9,261,078 B2* | 2/2016 | Calley | | F03D 7/0256 |
| 9,325,229 B2* | 4/2016 | Rozman | | H02P 9/48 |
| 9,793,046 B2* | 10/2017 | Rozman | | H01F 38/18 |
| 9,819,224 B2* | 11/2017 | Rozman | | H02J 9/061 |
| 2007/0170724 A1* | 7/2007 | Calley | | F03D 7/0256 |
| | | | | 290/44 |
| 2008/0103632 A1* | 5/2008 | Saban | | H02K 3/28 |
| | | | | 700/286 |
| 2009/0009146 A1* | 1/2009 | Rozman | | H02P 9/10 |
| | | | | 322/27 |
| 2009/0021022 A1* | 1/2009 | Calley | | F03D 7/0256 |
| | | | | 290/55 |
| 2009/0200809 A1* | 8/2009 | Saban | | H02J 3/30 |
| | | | | 290/4 R |
| 2010/0007145 A1* | 1/2010 | Calley | | F03D 7/0256 |
| | | | | 290/44 |
| 2010/0244599 A1* | 9/2010 | Saban | | H02K 3/28 |
| | | | | 310/71 |
| 2011/0133370 A1 | 6/2011 | Rozman et al. | | |
| 2012/0091939 A1 | 4/2012 | Rozman et al. | | |
| 2012/0326452 A1* | 12/2012 | Calley | | F03D 7/0256 |
| | | | | 290/40 B |
| 2013/0020804 A1* | 1/2013 | Roesmann | | F03B 15/00 |
| | | | | 290/44 |
| 2013/0181688 A1* | 7/2013 | Tupper | | H02P 9/02 |
| | | | | 322/61 |
| 2013/0325366 A1* | 12/2013 | Rozman | | H02J 1/00 |
| | | | | 702/35 |
| 2014/0145441 A1* | 5/2014 | Calley | | F03D 7/0256 |
| | | | | 290/44 |
| 2014/0265744 A1* | 9/2014 | Rozman | | H02P 9/48 |
| | | | | 310/68 D |
| 2014/0266078 A1* | 9/2014 | Rozman | | H02P 9/02 |
| | | | | 322/27 |
| 2014/0266079 A1* | 9/2014 | Rozman | | H02P 9/02 |
| | | | | 322/28 |
| 2015/0263526 A1* | 9/2015 | Kjær et al. | | H02J 3/386 |
| | | | | 290/44 |
| 2015/0349655 A1 | 12/2015 | Petersen et al. | | |

* cited by examiner

US 9,941,827 B2

HIGH VOLTAGE DC POWER GENERATING SYSTEM INCLUDING SELECTIVELY REMOVABLE NEUTRAL NODE

TECHNICAL FIELD

The present disclosure relates generally to DC power generating systems, and more specifically to a high voltage DC power generating system including a selectively removable neutral node.

BACKGROUND

Certain vehicles, such as ground based vehicles, favor hybrid electric technology using high voltage DC power generating as a primary power source for vehicle components. Many such applications utilize a permanent magnet generator (PMG) to generate the power due to the high available power density of permanent magnet generators. Permanent magnet generators convert mechanical input power of rotational motion into electrical output power via known interactions between the magnetic field of a permanent magnet and an armature winding, referred to herein as a "power winding". Excitation of the generator is provided by the permanent magnets, and the strength and presence of the excitation field is determined by the configuration and strength of the permanent magnets.

In typical permanent magnet generator arrangements, the excitation of rotor flux cannot be controlled, and the permanent magnet generator may operate in an undesirable fashion during short circuit conditions.

SUMMARY OF THE INVENTION

In one exemplary embodiment a high voltage DC electric power generating system includes a poly-phase permanent magnet generator having at least one control winding and a plurality of power windings, each of the power windings being a phase of the poly-phase permanent magnet generator, and a passive rectifier connecting a switch to an input of each of the power windings such that the switch is a neutral node in a closed state and a disconnect in an open state.

In another exemplary embodiment of the above described high voltage DC electric power generating system the at least one control winding is a plurality of control windings In another exemplary embodiment of any of the above described high voltage DC electric power generating systems each control winding in the plurality of control windings corresponds to a distinct power winding.

In another exemplary embodiment of any of the above described high voltage DC electric power generating systems each of the control windings is connected to a DC power source via a distinct power converter.

In another exemplary embodiment of any of the above described high voltage DC electric power generating systems each of the distinct power converters is one of a PWM inverter and a set of asymmetric H-bridges.

In another exemplary embodiment of any of the above described high voltage DC electric power generating systems each of the control windings is connected to a DC power source via a single power converter.

In another exemplary embodiment of any of the above described high voltage DC electric power generating systems the single power converter is an asymmetric H-bridge.

In another exemplary embodiment of any of the above described high voltage DC electric power generating systems each of the power windings is connected to a DC load via an active AC-DC rectifier.

Another exemplary embodiment of any of the above described high voltage DC electric power generating systems further includes a power converter connecting the at least one control winding to a DC power source.

In another exemplary embodiment of any of the above described high voltage DC electric power generating systems the AC-DC rectifier is a passive AC-DC rectifier.

Another exemplary embodiment of any of the above described high voltage DC electric power generating systems further includes a controller communicatively coupled to the switch, and configured to control an open/closed state of the switch.

In another exemplary embodiment of any of the above described high voltage DC electric power generating systems the poly-phase permanent magnet generator is a three phase voltage controlled permanent magnet generator.

An exemplary method for protecting a power generating system includes detecting a short circuit event, selectively removing a neutral node from a poly-phase permanent magnet generator, thereby preventing power generation for a duration of the short circuit event.

In another example of the above described exemplary method for protecting a power generating system selectively removing the neutral node from the permanent magnet generator comprises opening a switch connecting each leg of an AC-DC rectifier, the AC-Dc rectifier being connected to an input of each phase of the poly-phase permanent magnet generator.

In another example of any of the above described exemplary methods for protecting a power generating system selectively removing the neutral node comprises reducing a control input of a transistor to 0 volts, thereby placing the transistor in an open state.

Another example of any of the above described exemplary methods for protecting a power generating system further includes correcting a phase imbalance in the poly-phase permanent magnet generator by independently controlling control windings corresponding to each phase of the poly-phase permanent magnet generator.

In another example of any of the above described exemplary methods for protecting a power generating system independently controlling control windings comprises providing a current magnitude through at least one of the current windings that is distinct from a current magnitude through each other of the control windings.

An exemplary method for balancing a power output of a permanent magnet generator includes independently controlling a plurality of control windings, each of the control windings corresponding to a single phase of a poly-phase permanent magnet generator.

Another example of the above described exemplary method for balancing a power output of a permanent magnet generator further includes determining a current magnitude through each of the control windings required to provide a balanced output power, and providing the determined current magnitude to each of the phases of the poly-phase permanent magnet generator.

Another example of any of the above described exemplary method for balancing a power output of a permanent magnet generator further includes detecting a short circuit event and selectively removing a neutral node from the poly-phase generator in response to detecting the short circuit event.

In another example of the above described exemplary method for balancing a power output of a permanent magnet generator selectively removing the neutral node from the permanent magnet generator comprises opening a switch connecting each leg of an AC-DC rectifier, the AC-Dc rectifier being connected to an input of each phase of the poly-phase permanent magnet generator.

These and other features of the present invention can be best understood from the following specification and drawings, the following of which is a brief description.

DETAILED DESCRIPTION OF AN EMBODIMENT

Figure 1:
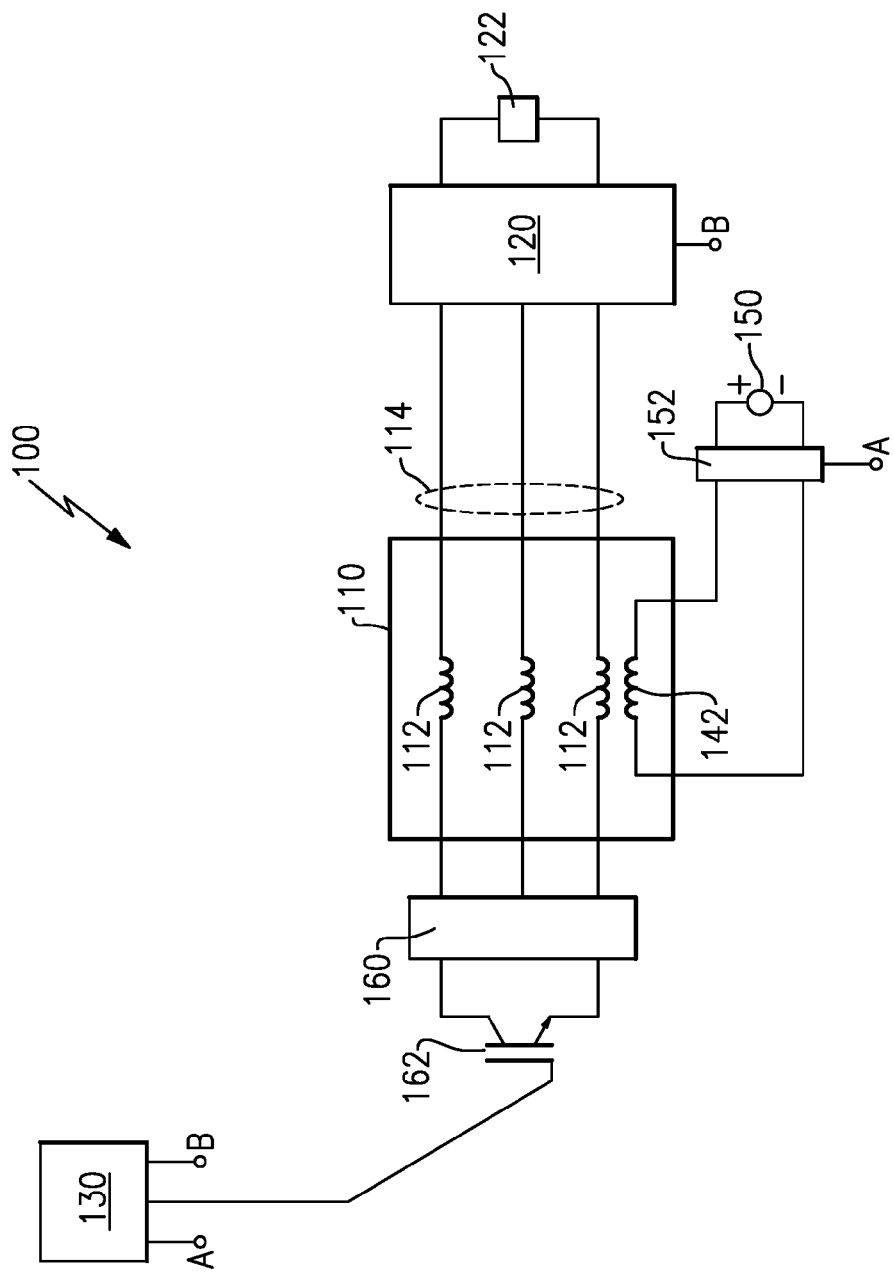
FIG. 1 schematically illustrates a high voltage DC power generating system according to one example.

FIG. 1 schematically illustrates a high voltage DC power generating system 100 according to one example. The power generating system 100 includes a three-phase voltage regulated permanent magnet generator 110 having three-phase power windings 112 and a control winding 142. While illustrated as a three phase permanent magnet generator 110, a poly-phase generator having any number of phases (and corresponding power windings) can be utilized to the same effect with only minor alterations to the system 100, as it is described herein. The permanent magnet generator 110 is constructed according to known voltage regulated permanent magnet generator configuration, and converts rotational motion from a prime mover into electrical energy.

The permanent magnet generator 110 includes a three phase output 114 that is provided to the active rectifier 120. The active rectifier 120 can be three-phase PWM active rectifier. In alternative examples, the active rectifier 120 can be replaced with a 6-pulse passive rectifier circuit including a six diode bridge. The active rectifier 120 is controlled via a control input B, which is connected to a control output B of a controller 130. Although illustrated as a single wire input, control input B and control output B can include any number of necessary control inputs and/or control signals to allow the controller 130 to fully control the active rectifier 120. The DC power output from the active rectifier 120 is provided to a DC bus 122 for power distribution to the load.

A control winding 142 is connected to a DC power source 150 via an asymmetrical H-bridge 152. The asymmetrical H-bridge 152 includes a control input A that receives a control output A from the controller 130. As with the active rectifier 120, the asymmetrical H-bridge 152 can include any number of necessary control wires and/or signals and is not limited to the single illustrated control connection. The magnitude of current passing through the control winding 142 controls the magnitude of power output at the power output 114 according to known relationships. In the example of FIG. 1, the single control winding 142 controls the power output 114 on all phases of the permanent magnet generator 110.

Opposite the power output 114, each of the power windings 112 is connected to a passive rectifier 160. Each leg of the passive rectifier 160, in turn, is connected to a single switch 162, such as a transistor. The switch 162 is controllably connected to the controller 130, and the controller 130 controls an open/closed state of the switch 162. While in a closed (conducting) state, the switch 162 functions as a neutral node connecting all the phases of the poly-phase permanent magnet generator 110 at a neutral point. While in an open (non-conducting) state, the switch 162 is electrically removed from the circuit and the poly-phase permanent magnet generator 110 lacks a neutral point. The lack of a neutral point breaks the operability of the permanent magnet generator 110 and the permanent magnet generator 110 ceases to provide power.

As a result of the ability to alter the switch 162 between a closed state and an open state, and thereby disconnect or reconnect the neutral node between the power windings 112, the switch 162 is referred to as a selectively removable neutral node.

The controller 130 includes current sensors configured to determine when a short circuit event, such as shorted load, is occurring according to any known short circuit detection procedure. When the permanent magnet generator 110 is subjected to a short circuit event, the controller 130 opens the switch 162, thereby selectively removing the neutral node from the permanent magnet generator 110 circuit. Removal of the neutral node, in turn, prevents the undesirable short circuit operations by preventing the permanent magnet generator 110 from generating power.

In some examples, it is possible for the power output 114 on one of the phases to be larger or smaller than the power output on the other phases. Such an occurrence is referred to as the phases becoming imbalanced. In the example power generating system 100 of FIG. 1, the control winding 142 controls all the phases simultaneously using the single control winding 142, and cannot balance the phases when such an imbalance occurs.

Figure 2:
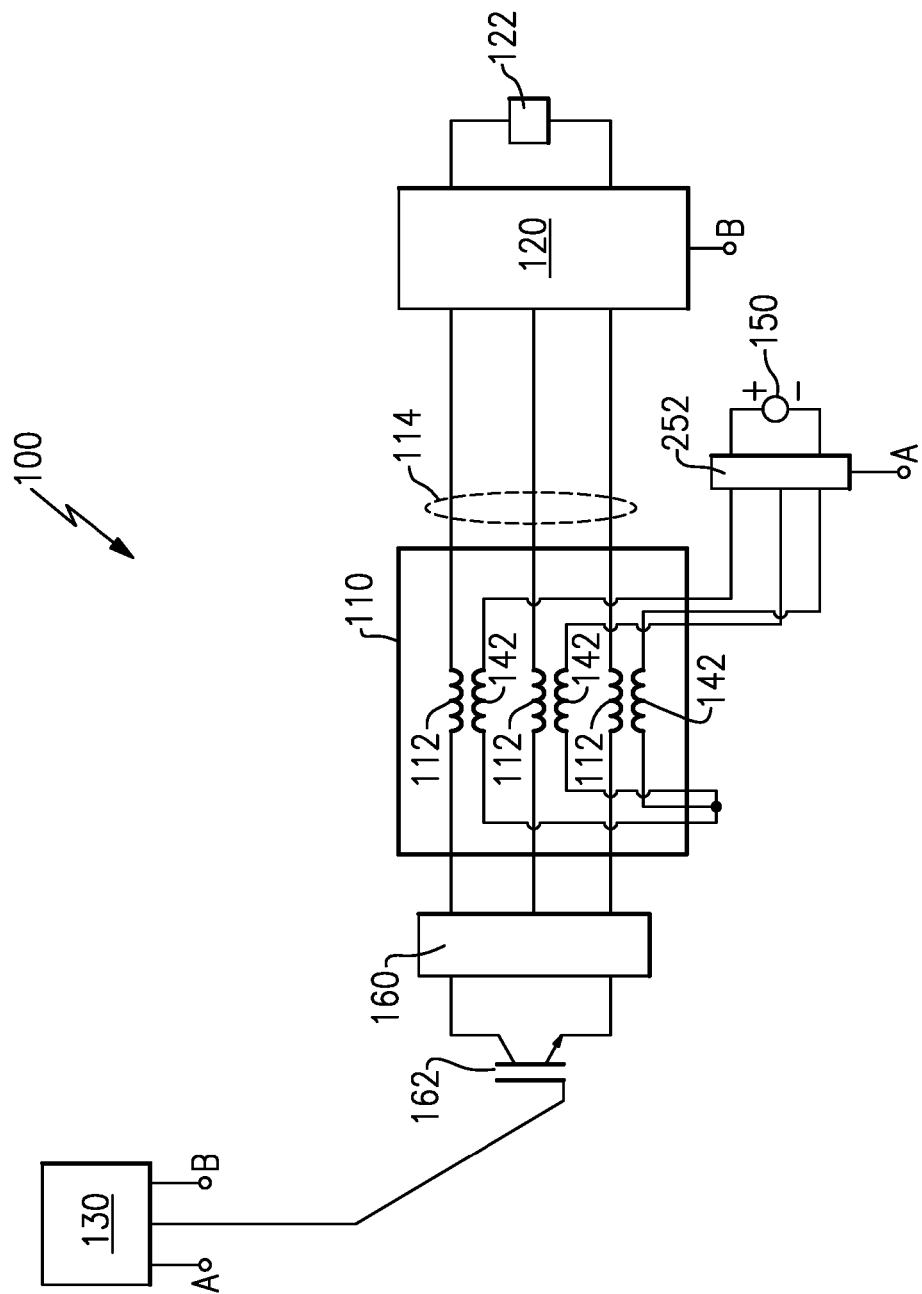
FIG. 2 schematically illustrates an example embodiment of the high voltage DC power generating system of FIG. 1, with additional control windings.

With continued reference to FIG. 1, and with like numerals indicating like elements, FIG. 2 illustrates an example embodiment of the high voltage DC power generating system 100 of FIG. 1, with additional control windings 142. Unlike the example of FIG. 1, multiple control windings 142 are utilized, with each control winding 142 corresponding to a single power winding 112. Each of the control windings 142 receives power from a pulse width modulated (PWM) inverter 252, which is, in turn, powered from a DC power source 150.

In this configuration, each of the control windings 142 is controlled through the PWM inverter 252. By providing different current levels to each control winding 142, the output voltage on each phase at the power output 114 can be adjusted independent of the power levels on each of the other phases. This allows the controller 130 to account for, and correct, an imbalanced system 100, ensuring that balanced power is provided to the active rectifier 120.

Figure 3:
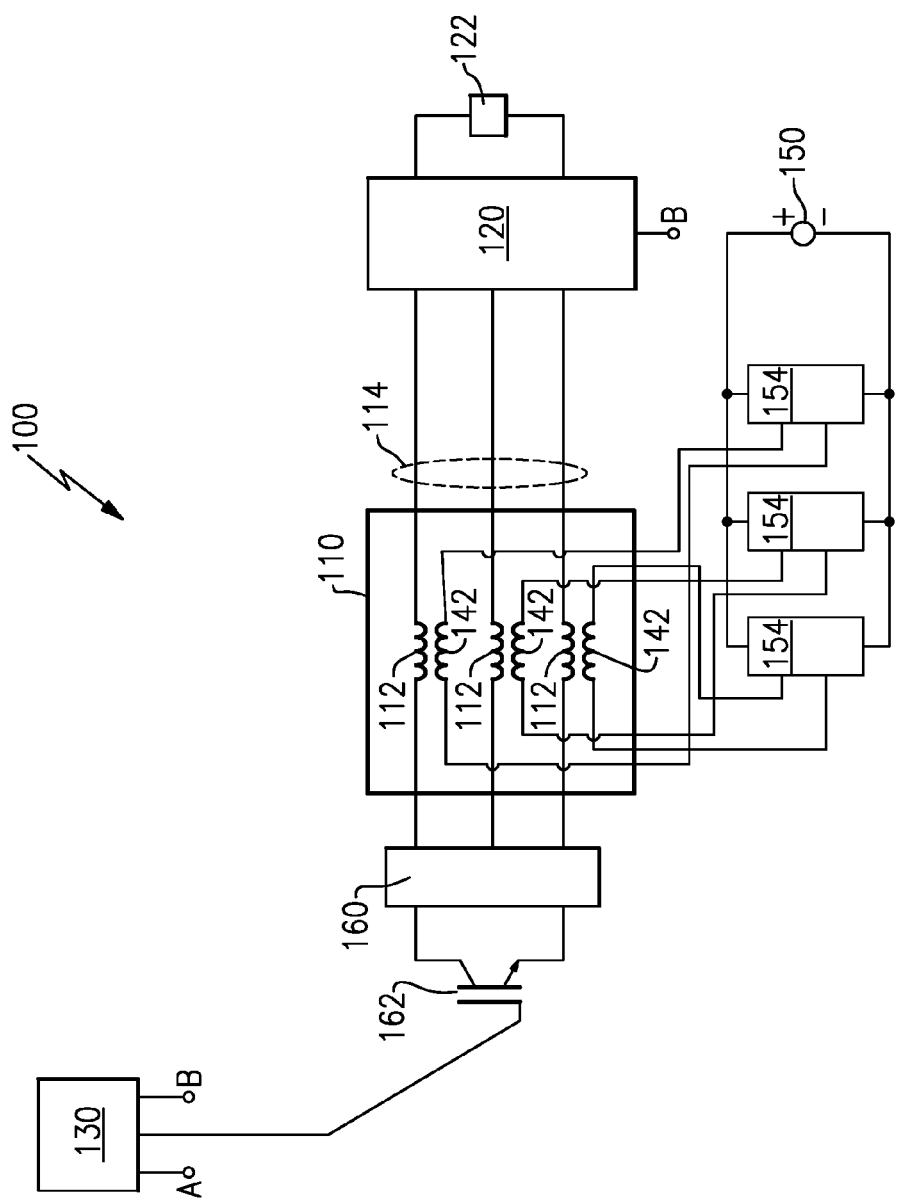
FIG. 3 schematically illustrates an example embodiment of the high voltage DC power generating system of FIG. 1, with independently controlled control windings.
Figure 4:
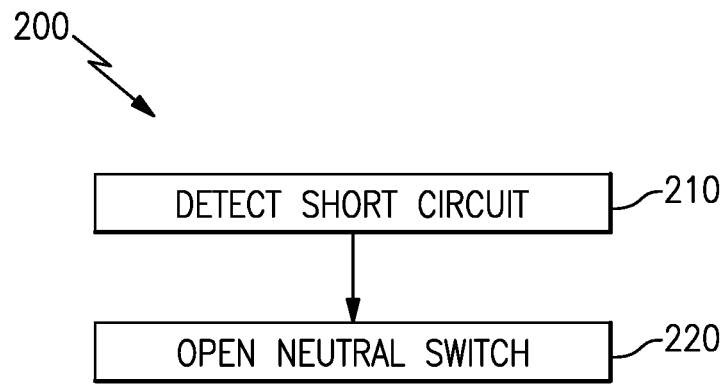
FIG. 4 illustrates a method for disconnecting a permanent magnet generator during a short circuit event.
Figure 5:
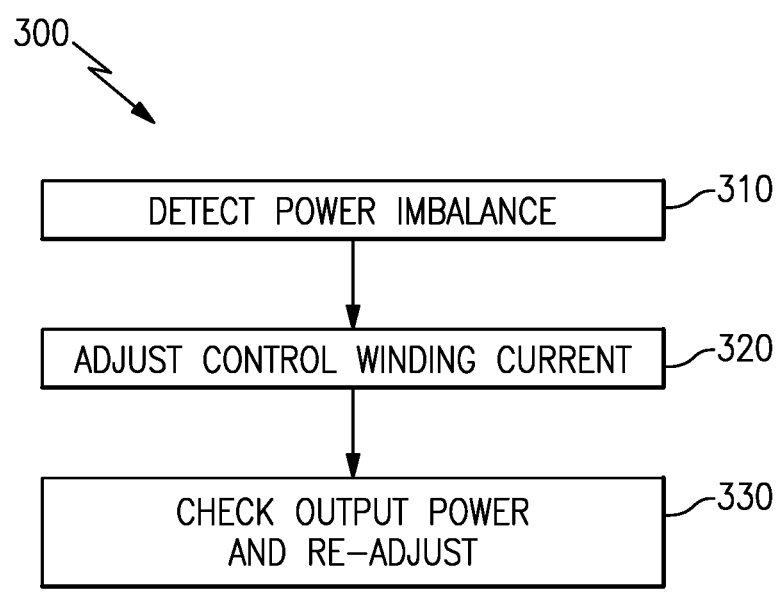
FIG. 5 illustrates a method for re-balancing a power output in a permanent magnet generator.

With continued reference to FIGS. 1 and 2, and with like numerals indicating like elements, the DC power generating system 100 of FIGS. 1 and 2 can be further altered to individually control each of the power windings 112. In the example of FIG. 3, each of the control windings 142 is connected to a DC power source 150 via independently controlled asymmetric H-bridges 154. In some examples, the asymmetric H-bridges 154 are controlled via the controller 130. In alternative examples, the asymmetric H-bridges 154 can be controlled via a distinct dedicated controller. Controlling each of the control windings 142 independently, via distinct connections, allows for finer control of the power windings 112, thereby further enabling the controller 130 to correct a phase imbalance in the generator 110.

With continued reference to FIGS. 1-3, FIG. 4 illustrates a control method 200 by which the controller 130 prevents the permanent magnet generator 110 from providing power to a power bus 122 in the presence of a short circuit condition. Initially, the controller 130 detects the short circuit using any known short circuit detection technique in a "Detect Short Circuit" step 210. Once the short circuit has been detected, the controller 130 opens the neutral switch 162 in an "Open Neutral Switch" step 220. In examples where the neutral switch 162 is a transistor, the neutral switch 162 is opened by removing, or otherwise altering, a control signal provided to the gate input of the switch 162. In alternative examples, the neutral switch 162 can be any other known electrical switch type, and controlled by conventional means.

When the controller 130 opens the neutral switch 162, the neutral node of the power windings 112 is removed from the circuit, and the permanent magnet generator 110 is prevented from generating power. In this way, the controller 130 prevents power from being provided to the DC bus 122 until the short circuit condition is removed, or is otherwise addressed.

With continued reference to FIGS. 1-4, FIG. 5 illustrates a method 300 by which the controller 130 corrects an imbalance within a power output 114 of a permanent magnet generator 110 including a selectively removable neutral mode. Initially, when the controller 130 detects an imbalance between the phases of the power output 114, the controller 130 enters a "Detect Power Imbalance" step 310. During the detect power imbalance step 310, the controller 130 determines the actual power being output on each phase, and determines an adjustment that must be made to one or more phases of the power output 114 in order to ensure that power output on each phase is the same. The controller 130 performs this determination using any conventional means.

Once the determination has been made, the controller 130 adjusts the power provided to one or more of the control windings 142 in an "Adjust Control Winding" step 320. Once the current provided to the control winding has been adjusted, the controller 130 again checks the power levels of the phases at the output 114 and re-adjusts the control winding power as necessary in a "Check Output Power and Re-Adjust" step 330.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A high voltage DC electric power generating system comprising:
a poly-phase permanent magnet generator having at least one control winding and a plurality of power windings, each of said power windings being a phase of the poly-phase permanent magnet generator; and
a passive rectifier connecting a switch to an input of each of said power windings such that said switch is a neutral node in a closed state and a disconnect in an open state.

2. The high voltage DC electric power generating system of claim 1, wherein the at least one control winding is a plurality of control windings.

3. The high voltage DC electric power generating system of claim 2, wherein each control winding in said plurality of control windings corresponds to a distinct power winding.

4. The high voltage DC electric power generating system of claim 3, wherein each of said control windings is connected to a DC power source via a distinct power converter.

5. The high voltage DC electric power generating system of claim 4, wherein each of said distinct power converters is one of a PWM inverter and a set of asymmetric H-bridges.

6. The high voltage DC electric power generating system of claim 3, wherein each of said control windings is connected to a DC power source via a single power converter.

7. The high voltage DC electric power generating system of claim 6, wherein said single power converter is an asymmetric H-bridge.

8. The high voltage DC electric power generating system of claim 1, wherein each of said power windings is connected to a DC load via an active AC-DC rectifier.

9. The high voltage DC electric power generating system of claim 1, further comprising a power converter connecting said at least one control winding to a DC power source.

10. The high voltage DC electric power generating system of claim 9 wherein the AC-DC rectifier is a passive AC-DC rectifier.

11. The high voltage DC electric power generating system of claim 1, further comprising a controller communicatively coupled to said switch, and configured to control an open/closed state of the switch.

12. The high voltage DC electric power generation system of claim 1, wherein the poly-phase permanent magnet generator is a three phase voltage controlled permanent magnet generator.

13. A method for protecting a power generating system comprising:
detecting a short circuit event;
selectively removing a neutral node from a poly-phase permanent magnet generator, thereby preventing power generation for a duration of the short circuit event.

14. The method of claim 13, wherein selectively removing the neutral node from the permanent magnet generator comprises opening a switch connecting each leg of an AC-DC rectifier, the AC-Dc rectifier being connected to an input of each phase of the poly-phase permanent magnet generator.

15. The method of claim 13, wherein selectively removing the neutral node comprises reducing a control input of a transistor to 0 volts, thereby placing the transistor in an open state.

16. The method of claim 13, further comprising correcting a phase imbalance in said poly-phase permanent magnet generator by independently controlling control windings corresponding to each phase of the poly-phase permanent magnet generator.

17. The method of claim 16, wherein independently controlling control windings comprises providing a current magnitude through at least one of said current windings that is distinct from a current magnitude through each other of the control windings.

18. A method for balancing a power output of a permanent magnet generator comprising:
independently controlling a plurality of control windings, each of said control windings corresponding to a single phase of a poly-phase permanent magnet generator.

19. The method of claim 18, further comprising determining a current magnitude through each of said control windings required to provide a balanced output power, and providing the determined current magnitude to each of said phases of the poly-phase permanent magnet generator.

20. The method of claim 18, further comprising detecting a short circuit event and selectively removing a neutral node from the poly-phase generator in response to detecting the short circuit event.

21. The method of claim 20, wherein selectively removing the neutral node from the permanent magnet generator comprises opening a switch connecting each leg of an AC-DC rectifier, the AC-Dc rectifier being connected to an input of each phase of the poly-phase permanent magnet generator.

* * * * *